May 10, 1932. C. E. JOHNSON 1,857,383
GRASS TRIMMER FOR SPRINKLING SYSTEM NOZZLES
Filed July 22, 1929
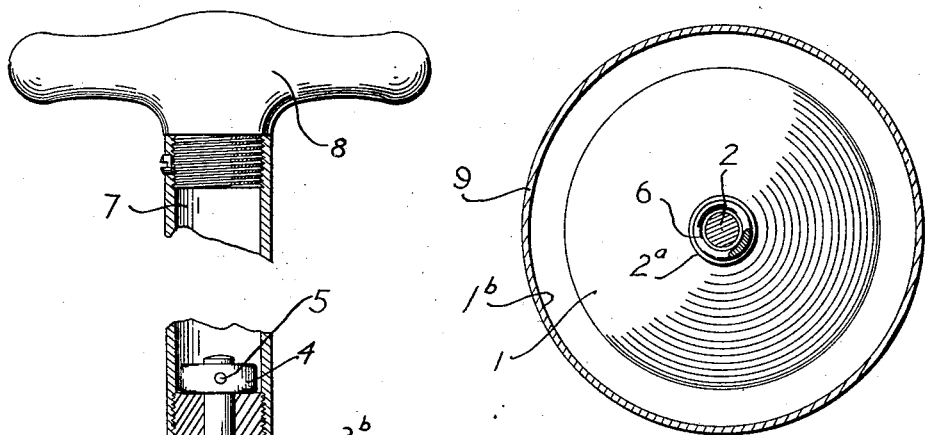
FIG. 3
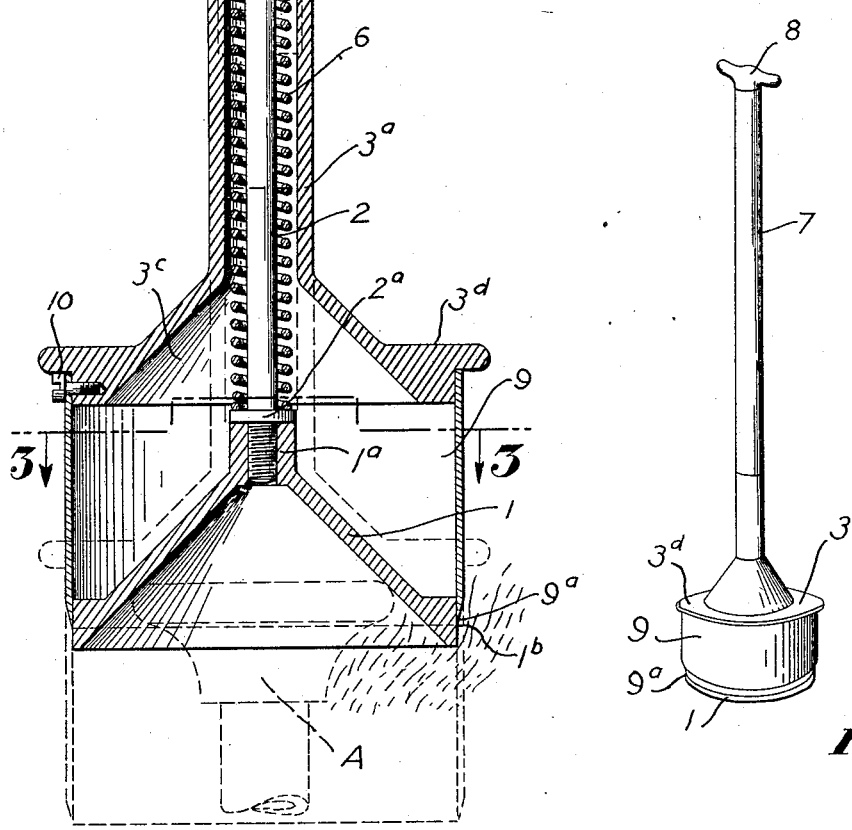
FIG. 2
FIG. 1
INVENTOR.
CARL E. JOHNSON
BY
A. B. Bowman
ATTORNEY.

Patented May 10, 1932

1,857,383

UNITED STATES PATENT OFFICE

CARL EMIL JOHNSON, OF CORONADO, CALIFORNIA

GRASS TRIMMER FOR SPRINKLING SYSTEM NOZZLES

Application filed July 22, 1929. Serial No. 379,980.

My invention relates to grass trimmers for sprinkling system nozzles or heads, and the objects of my invention are: first, to provide a device of this class which quickly and efficiently trims the grass which grows up around sprinkling system nozzles or heads, which grass formerly had to be removed by hand operated shears, or other manual means requiring a great deal of time and labor; second, to provide a device of this class which readily centers itself relative to the sprinkler head or nozzle before the blade is brought into use; third, to provide a device of this class in which a knife blade is protected from contact with the sprinkler head nozzle or other object that would cause injury; fourth, to provide a device of this class in which the knife cannot readily injure a person or child who might pick it up accidentally; fifth, to provide a device of this class which may be manipulated by merely a short downward stroke and a twist of the handle while the operator stands upright, thereby saving a great deal of labor and effort formerly required for this work; sixth, to provide a device of this class which may be operated by the foot if desired; seventh, to provide a device of this class in which the blade may be readily removed for replacement or sharpening; eighth, to provide a device of this class which is compact and easily carried, and ninth, to provide on a whole a novelly constructed trimmer of this class which is simple and economical of construction and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a perspective view of my trimmer; Fig. 2 is a fragmentary sectional view thereof through 2—2 of Fig. 1, with parts and portions shown in elevation to facilitate the illustration; and Fig. 3 is an enlarged transverse sectional view thereof through 3—3 of Fig. 1.

Similar characters of reference refer to similar parts and portions throughout the several views of the drawings.

Centering member 1, rod 2, plunger 3, collar 4, pin 5, spring 6, pipe member 7, handle 8, knife member 9, and screws 10, constitute the principal parts and portions of my grass trimmer.

The centering member 1 is substantially conical shape with its apex extending upwardly and provided with a boss portion 1a. The boss portion 1a is hollow and internally threaded so as to receive a rod 2 which screws into said boss portion 1a until stopped by a shoulder 2a surrounding the rod.

The rod 2 extends upwardly in centered spaced relation to a tubular portion 3a of a plunger 3. The bore at the upper end of the tubular portion 3a is constricted forming a sleeve portion 3b through which the rod 2 extends. The upper end of the rod 2 is provided with a collar member 4 held in place by a pin 5. A spring 6 is positioned between the shoulder formed at the under side of the sleeve portion 3b and the upper side of the stop member 2a which rests on top of the boss portion 1a. The spring tends to hold the upper end of the plunger 3 against the collar 4.

The upper portion of the plunger 3 surrounding the sleeve 3b is externally threaded for receiving the internally threaded lower end of a pipe member 7. The outer surface of said pipe member forms a continuation of the outer surface of the tubular portion 3a and extends upwardly far enough to be readily grasped by the hand when the operator is standing upright. The upper end of the pipe member 7 is provided with a suitable handle 8 capable of permitting the user to twist the plunger as well as press down upon it.

The lower end of the tubular portion 3a of the plunger joins integrally with a conical portion 3c, the under side of which conforms substantially to the upper side of the centering member 1. The outer or lower margin of the conical portion 3c is thickened and forms a flat annular foot engaging portion 3d on its upper side, as shown in Figs. 1 and 2.

Below this foot engaging portion the outer periphery of the conical portion 3c is made cylindrical and annular so as to receive the upper end of a cylindrical annular knife 9 which is secured to said cylindrical portion by screws 10.

The lower edge of the knife 9 is beveled inwardly forming a sharp cutting edge. The lower outer margin of the centering member 1 is made cylindrical so as to form a guide 1b for the lower or cutting edge of the knife 9.

The knife is made long enough so that when the plunger is in its upper position the cutting edge 9a of the knife is slightly above the lower margin of the guide portion 1b, and therefore the guide portion also forms a guard for the knife edge, as shown in Fig. 2.

My device is used as follows: The centering means is placed over a sprinkling system nozzle or head A, as shown by dotted lines in Fig. 1. The conical under side of the centering means makes it possible to readily center it over the sprinkling head. As soon as the trimmer is centered, the handle 8 or foot engaging portion 3d is pressed downwardly causing the knife to move below the centering member 1 and cut into the grass, as indicated by the dotted position of the knife member and plunger. Together with the downward movement of the knife, it may be turned causing the cutting edge to saw on the roots of the grass blades.

It is obvious from the construction as illustrated in the drawings and described in the foregoing specification that there is provided a grass trimmer as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a grass trimmer for sprinkling system nozzles, an annular centering means having a conical lower face adapted to fit over a sprinkling head of a sprinkling system, a rod secured thereto and extending upwardly from said centering means, a collar at the upper end of said rod, a flanged plunger reciprocally mounted on said rod and enclosing both said rod and collar, means for resiliently holding said plunger in raised relation to said centering means, and a knife secured to said plunger and extending over and guided by said centering means.

2. In a grass trimmer for sprinkling system nozzles, an annular centering means having a conical lower face adapted to fit over a sprinkling head of a sprinkling system, a rod secured thereto and extending upwardly from said centering means and having a head on its upper end, a flanged plunger reciprocally mounted on said rod and enclosing said rod and head, means for resiliently holding said plunger in raised relation to said centering means and a knife secured to said plunger and extending over and guided by said centering means.

In testimony whereof, I have hereunto set my hand at San Diego, California, this 13th day of July, 1929.

CARL EMIL JOHNSON.